United States Patent [19]
Bollansee et al.

[11] Patent Number: 5,640,190
[45] Date of Patent: Jun. 17, 1997

[54] NON-IMPACT PRINTER WITH EVENNESS CONTROL

[75] Inventors: Erik Marcel Lieva Armand Bollansee, Borgerhout; Lieven Jacob Leontine De Clercq, Wetteren; Lucien Amede De Schamphelaere, Edegem; Koenraad Leontine Edward Van Hulle, Aartselaar, all of Belgium

[73] Assignee: Xeikon N.V., Mortsel, Belgium

[21] Appl. No.: 257,119

[22] Filed: Jun. 8, 1994

[30] Foreign Application Priority Data

Jun. 18, 1993 [EP] European Pat. Off. .............. 93304767

[51] Int. Cl.$^6$ ...................................................... B41J 2/47
[52] U.S. Cl. ................................................... 347/240
[58] Field of Search ............................. 347/14, 19, 140, 347/240, 119; 358/521

[56] References Cited

U.S. PATENT DOCUMENTS

| | | |
|---|---|---|
| 4,455,562 | 6/1984 | Dolan et al. . |
| 4,750,010 | 6/1988 | Ayers et al. . |
| 4,855,760 | 8/1989 | Kanayama . |
| 4,864,216 | 9/1989 | Kalata et al. . |
| 4,952,949 | 8/1990 | Uebbing . |
| 4,998,118 | 3/1991 | Ng . |
| 5,121,146 | 6/1992 | Smith et al. . |
| 5,124,726 | 6/1992 | Morton et al. . |
| 5,276,459 | 1/1994 | Danzuka et al. ............. 347/14 |
| 5,313,233 | 5/1994 | Nagase et al. ............. 347/140 |

FOREIGN PATENT DOCUMENTS

| | | |
|---|---|---|
| 3813664 | 11/1988 | Germany . |
| 8702162 | 4/1987 | WIPO . |

*Primary Examiner*—Benjamin R. Fuller
*Assistant Examiner*—Thinh Nguyen
*Attorney, Agent, or Firm*—Brumbaugh, Graves, Donohue & Raymond

[57] ABSTRACT

A non-impact printer is described for forming an image on a medium. The printer having:

a linear array of recording sources for forming a multi-gradation latent image on a receptor surface, the linear array comprising a plurality of sub-sets of recording sources;

an element for developing the latent image into a visual image;

an element for transferring said visual image onto the medium;

an element for generating and storing first correction factors derived from measurements of the non-uniformity of average energy output of each of the sub-sets of recording sources;

first correction element for applying, for each sub-set of recording sources, the first correction factors;

an element for generating and storing second correction factors derived from measurements of the non-uniformity of each individual one of the recording sources; and second correction element for applying said second correction factors after applying the first correction factors.

20 Claims, 12 Drawing Sheets

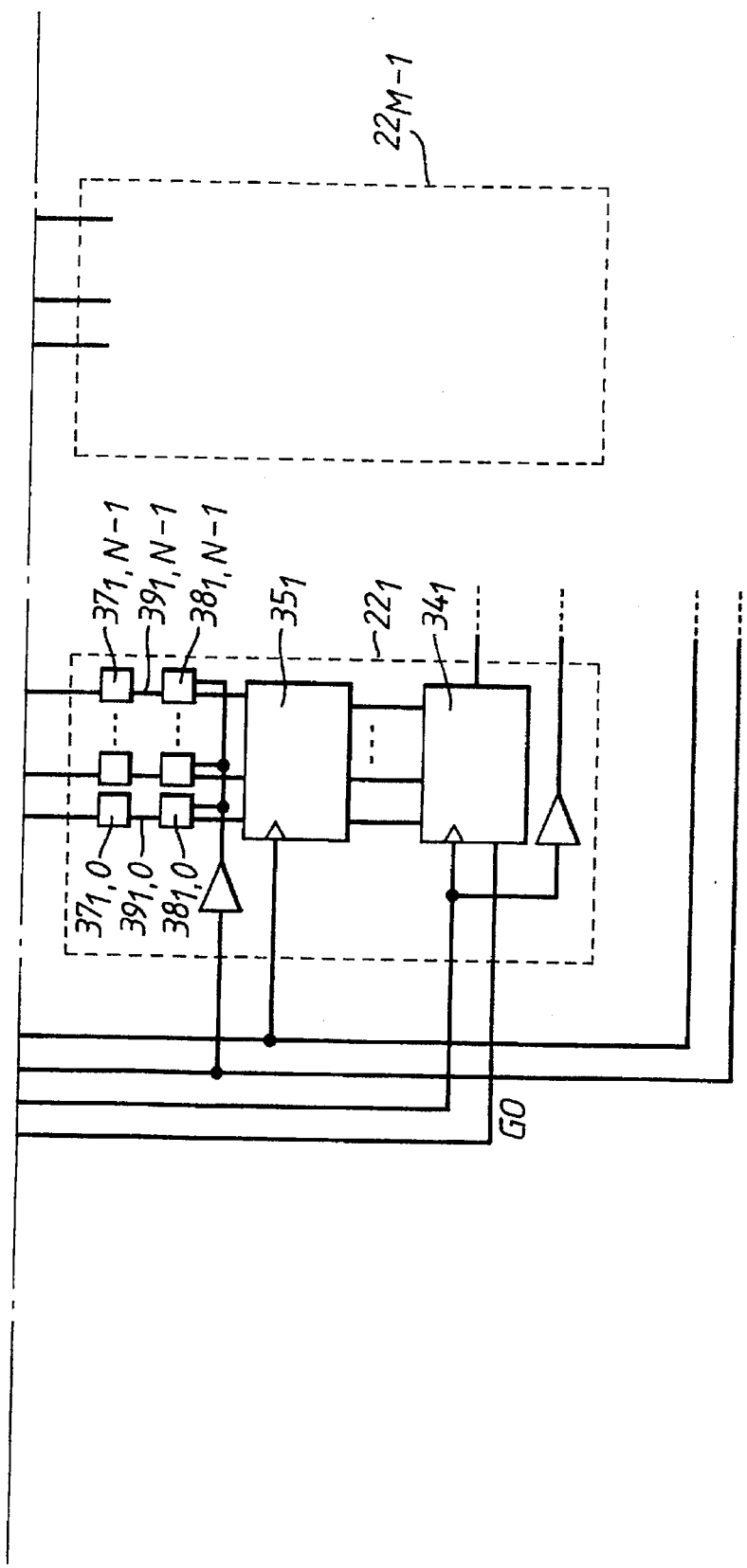

NON-IMPACT PRINTER WITH EVENNESS CONTROL

FIELD OF THE INVENTION

The present invention relates to an non-impact printer incorporating a linear array of recording sources. More in particular, the invention relates to the correction of undesired unevenness of the optical density of the produced images.

Examples of non-impact printers include, but are not restricted to include only, (i) recording sources such as light emitting diodes (LEDs), ion deposition control electrodes, (ii) receptor means such as organic photoconductive (OPC) drums, capacitive drums, (iii) developing means such as dry or liquid toner development units and (iv) transfer means such as electrostatic transfer systems.

In a printer wherein LEDs are used as recording sources, the linear lens used with said LED-based printer is considered to be fictively divided into as many partial lenses as there are recording sources, each of said partial lenses being considered a part of a single recording source. As such, when describing a linear array of LEDs, a recording source comprises (i) a LED, (ii) a current source driving the LED and (iii) the portion of the lens responsible for projecting the light of the respective LED onto the receptor surface. In general, said recording source comprises the spot-specific electrical, mechanical and/or optical means needed to produce a single spot on a receptor surface.

BACKGROUND OF THE INVENTION

In many existing non-impact printers an image is built by repetitively producing lines of spots, each spot being formed by means of one of a number of recording sources forming a linear array of said recording sources. Each of said recording sources delivers a controlled amount of energy to a receptor surface in order to form a latent image on said receptor surface. Also, said non-impact printers comprise means for developing said latent images and transferring the developed images to the output medium, being paper or the like.

In such printers, multiple gradation levels of the optical density of each spot constituting an image to be printed are obtained by providing multiple energy levels for each spot, and as energy equals power times time, each of the recording sources is typically driven with a constant output power level, for a period of time proportional to the gradation value of the respective spot. This approach is much easier to implement than the approach wherein the multiple energy levels are obtained by providing multiple levels of output power for a constant period of time. In printers where the recording sources comprise LEDs for example, multiple optical energy levels are obtained by driving each of the LEDs by means of a source of constant current during a precisely controlled amount of time.

However, by applying the above mentioned techniques, the evenness of the optical density of the different spots of the printed image largely depends on the evenness of the energy levels supplied by the respective recording sources. It is now known that there are many causes of such unevenness of energy levels (the following list relates to LED-based printers, but similar problems are encountered with other non-impact printers). It is herein assumed that the recording sources are arranged in a plurality of recording modules, each recording module comprising a sub-set of recording sources so that the manufacturing of said linear array of recording sources becomes more feasible.

1) Due to manufacturing tolerances, the reference voltage or current which controls the average current level for each LED of a subset, can vary between different recording modules.
2) The current supplied by said individual sources of constant current can vary due to manufacturing tolerances.
3) Again due to manufacturing tolerances, but also due to the unequal ageing of the different LEDs, differences in the optical energy output of the LEDs can occur.
4) The linear lens (e.g. an array of focusing fibres) used to project the light emitted by the LEDs typically shows a uneven attenuation over its length.
5) Due to dirt, such as splinters produced when sawing the LED-chips, which can reside on the LED surface, the light emitted by the respective LED can become reduced.

Also, the means for rendering said latent image visual onto the target medium can show defects that introduce unevenness of the optical density of the produced images, said defects typically resulting in stripes or bands to become visible.

It is therefore desirable to provide for means to correct for the most substantial of these errors so that the unevenness in optical density of the produced images is brought to an acceptable level. This is especially true if said printers are, as opposed to binary printers wherein each spot can have only two possible gradation or density levels, capable of producing more than two density levels per spot.

In U.S. Pat. No. 4,855,760 (assigned to Fuji Photo film Co.) a method is disclosed for controlling the generation of multiple gradation levels for each spot, said method being applicable in a non-impact printer using a linear array of LEDs. Also described is a circuit for applying a correction to the gradation data fed to the LEDs in order to compensate for their non-uniform light-emitting intensity. Said correction is carried out by changing the gradation value of a spot to be printed so that the corrected gradation value compensates for the previously measured deviation of the intensity of the respective LED compared to the intensity of a reference LED. In order however to be able to correct for the LEDs having a too low energy output level, a number of gradation values are lost.

In U.S. Pat. No. 4,575,739 (assigned to Agfa-Gevaert N.V.) an apparatus is described incorporating means to control the average current of a subset of LEDs. Said apparatus provides means to select after measuring the average current of the LEDs of the subset, from an external array of four resistors, one of fifteen combinations of resistors that generates, from a fixed voltage, a reference current to which the current of each individual LED is made proportional. Apart from raising the production cost, this correction technique does not compensate for any differences in the individual current sources. Also, and this counts for most hard-wired correction techniques, it is difficult to repeat the correction process when, e.g. due to ageing, the non-uniformity pattern has changed.

In practice, it is found that the magnitude of the non-uniformities of the LEDs of an array can be substantial. Also, when said array of LEDs is being constructed by means of a number of recording modules containing a subset of LEDs, the magnitude of the non-uniformities of the average energy output of said subsets of LEDs add to the magnitude of the non-uniformities of the individual LEDs. Therefore, the number of gradation values needed for correcting weaker LEDs increases.

In addition, neither of the above techniques provides means to correct the unevenness of the optical density of printed images due to non-uniformities introduced by the process of developing a latent image, transferring said developed image onto a medium and fixing said transferred image onto the medium.

It is therefore an object of the invention to provide a printer incorporating a linear array of recording sources, which allows for correction of unevenness of the optical density of the produced image while reducing the number of gradation levels to be reserved for correction purposes and at the same time allows such correction to be easily repeated after said unevenness pattern has changed. A further object of the invention is to provide means to correct the unevenness of the optical density of an image introduced when such image is visualised from a latent image.

SUMMARY OF THE INVENTION

In accordance with a first aspect of the present invention there is provided a non-impact printer for forming an image on a medium, which printer comprises:

a linear array of recording sources for forming a multi-gradation latent image on a receptor surface, said linear array comprising a plurality of sub-sets of recording sources;

means for developing said latent image into a visual image;

means for transferring said visual image onto said medium;

first correction storage means for storing first correction factors derived from measurements of the non-uniformity of the average energy output of the recording sources of said sub-sets of recording sources;

first correction means for applying, for each sub-set of recording sources, said first correction factors;

second correction storage means for storing second correction factors derived from said measurements of the non-uniformities of the energy output of each one of said individual recording sources, after said first correction factors have been applied; and second correction means for applying said second correction factors after applying said first correction factors.

This aspect of the invention also provides a method of adjusting a non-impact printer for forming an image on a medium, which printer comprises:

a linear array of recording sources for forming a multi-gradation latent image on a receptor surface, said linear array comprising a plurality of sub-sets of recording sources;

means for developing said latent image into a visual image;

means for transferring said visual image onto said medium;

the method comprising the steps of:

measuring the average energy output of each of said sub-sets of recording sources;

generating and storing first correction factors derived from said measurements of the non-uniformity of the energy output of said sub-sets of recording sources;

applying, for each sub-set of recording sources, said first correction factors;

measuring the energy output of each individual one of said recording sources;

generating and storing second correction factors derived from said measurements of the non-uniformity of the energy output of each individual one of said recording sources; and applying said second correction factors after applying said first correction factors.

Preferably, the printer employs a plurality of light emitting diodes to comprise the said linear array of recording sources. In general, said recording sources can also be based on other techniques such as heating elements in thermal transfer printers, and ion flow gating electrodes used in ionographic printers. As indicated above, the means for rendering said latent image visual onto the target medium can show defects that typically result in stripes or bands appearing in the produced images. When such bands are persistent over a longer period of time and are in a direction perpendicular to the direction in which said linear array of recording sources is mounted, it is possible to measure the unevenness of the optical density of a test image, and from these measurements compute correction factors to be applied to all spots to be printed by the respective LEDs.

Thus, in a preferred embodiment of the method according to the invention, one or more images are printed after the application of said first and second correction factors, the unevenness of the optical density of said one or more printed images is measured, third correction factors derived from measurement of the unevenness of the optical density of one or more printed images are generated and stored; and a correction of the unevenness of the optical density of the image to be printed are provided according to said stored third correction factors.

In order to detect bands or stripes that are introduced by the developing, transfer and/or fixing processes, a laterally disposed test pattern may be printed by means of a recording head wherein the recording sources are already corrected by means of said first and second correction means. This pattern is then scanned in the lateral direction to measure the profile of the optical density of the printed pattern.

It is also possible to print a longitudinally disposed pattern and scan the resulting print in the longitudinal direction to detect periodic unevenness in the longitudinal direction and to derive therefrom correction factors to correct for such unevenness. This unevenness may result, for example, form the eccentricity or unroundness of any of the cylindrical parts of the said rendering means, such as the receptor drum or magnetic brush of a dry toner development unit, or from the bandwise irregularities of said parts. Because of the periodic nature of this unevenness, it is possible to provide for one or more encoder means which produces pulses that are indicative of the angular displacement of such parts, and from these pulses to select an appropriate correction factor with which all the gradation values of the respective image lines to be printed are corrected.

In one embodiment of the invention, the printer includes means for measuring the average energy output of each of said sub-sets of recording sources. Preferably, the printer according to the invention includes means for measuring the energy output of each individual one of said recording sources. Although it is preferred to include the means for measuring the average energy output of each of said sub-sets of recording sources and the means for measuring the energy output of each individual one of said recording sources in the printer, these means may be externally provided. Thus for example the manufacturer of the printer may measure the average energy output of each of said sub-sets of recording sources and measure the energy output of each individual one of said recording sources in the printer before the printer is distributed to a customer.

Preferably, the printer further comprises:

third correction storage means for storing third correction factors derived from measurement of the unevenness of the optical density of one or more printed images printed after the application of said first and second correction factors; and third correction means for providing a correction of the unevenness of the optical density of the image to be printed according to said stored third correction factors.

It is possible for the third correction factors to be combined with the second correction factors to produce combined correction factors to be applied. In particular, the printer may include means for measuring the optical density of one or more printed images printed after the application of said first and second correction factors.

In the printer according to the invention, the recording sources may comprise sources of constant current in the form of a current mirror circuit which produces a current for the respective recording source, which current is proportional to a reference current or voltage.

The first correction means may comprise for each subset of recording sources a shift register for transferring the said first correction factors to a latch register temporarily storing said first correction factors, while applying the latter to a digital-to-analog converter generating said reference current or voltage which controls the average energy output by said subset of recording sources.

In a preferred embodiment, the second correction means corrects the gradation data for each recording source according to the respective said second correction factor.

The second correction storage means preferably comprises a look-up table storing, for each gradation value and for each recording source, a corrected gradation value derived from said second correction factors.

In order to achieve this, the second correction storage means may comprise a first look-up table storing the recording source class number, and a second look-up table storing, for each gradation value and for each recording source class number, a corrected gradation value derived from said second correction factors.

Preferably, both the first correction storage means and the second correction storage means are in the form of non-volatile memories.

According to a second aspect of the invention, there is provided a non-impact printer for forming an image on a medium, which printer comprises:

a linear array of recording sources for forming a multi-gradation latent image on a receptor surface, said linear array comprising a plurality of sub-sets of recording sources;

means for developing said latent image into a visual image;

means for transferring said visual image onto said medium;

means for storing correction factors derived from measurements of the non-uniformity of energy output of each individual one of said recording sources; and correction means for applying said correction factors, wherein the recording sources are classified in a plurality of classes, based upon their respective correction factor $K_i$, each of such classes comprising recording sources having about the same factor $K_c$, and each recording source is then corrected using said correction factor $K_c$, which is representative for all recording sources of the class to which that recording source belongs.

PREFERRED EMBODIMENT OF THE INVENTION

The invention will now be further described, purely by way of example, with reference to the accompanying drawings, wherein:

FIG. 2a shows a diagrammatical cross-sectional view of a recording head; and

FIG. 2b illustrates the positioning of the LED chip and the associated driver chips on a module carrier;

FIG. 2c is a schematic of an electronic circuit controlling said recording head;

FIG. 2d is an electronic schematic of a driver chip implementing an more preferred method of modulating the operative time of the LEDs;

FIG. 2e illustrates how the relation between the gradation data and the operative time of the LEDs is controlled;

Figure 1:
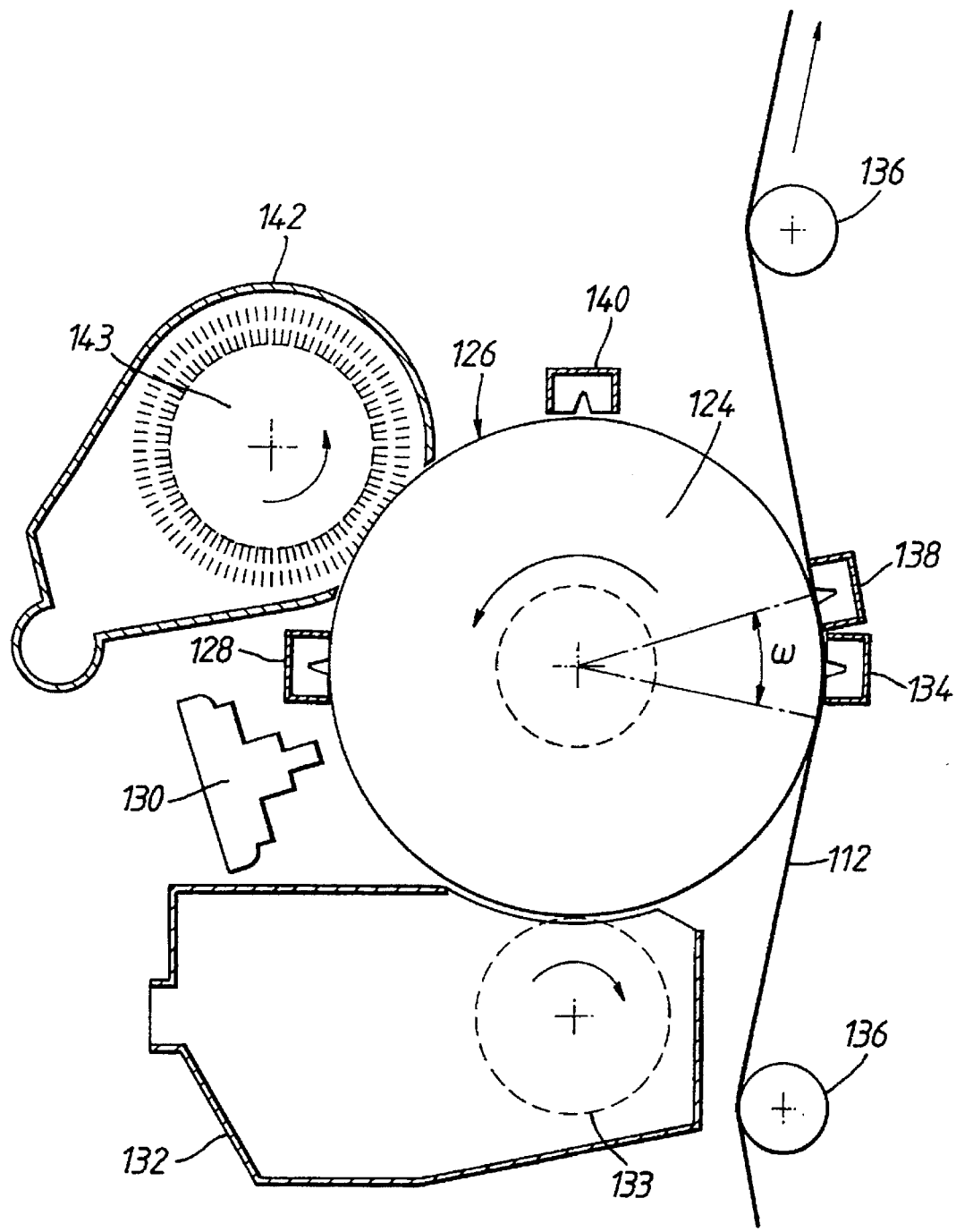
FIG. 1 illustrates the operation of a printing station of a non-impact printer according to the invention.

Referring to FIG. 1, the printing station comprises a cylindrical drum 124 having a photoconductive outer surface 126 forming an electrostatographic receptor means. Circumferentially arranged around the drum 124 there is a main corotron or scorotron charging device 128 capable of uniformly charging the drum surface 126, for example to a potential of about −600 V, an image recording means 130 which may, for example, be in the form of an LED array, which will image-wise and line-wise expose the photoconductive drum surface 126 causing the charge on the latter to be selectively dissipated, for example to a potential of about −250 V, leaving an image-wise distribution of electric charge to remain on the drum surface 126. This so-called "latent image" is rendered visible by a developing station 132 which by means known in the art will bring a developer in contact with the drum surface 126. The developing station 132 includes a developer drum 133 which is adjustably mounted, enabling it to be moved radially towards or away from the drum 124. According to one embodiment, the developer contains (i) toner particles containing a mixture of a resin, a dye or pigment of the appropriate colour and normally a charge-controlling compound giving triboelectric charge to the toner, and (ii) carrier particles charging the toner particles by frictional contact therewith. The carrier particles may be made of a magnetic material, such as iron or iron oxide. In a typical construction of a developer station, the developer drum 133 contains magnets carried within a rotating sleeve causing the mixture of toner and magnetic material to rotate therewith, to contact the surface 126 of the drum 124 in a brush-like manner. Negatively charged toner particles are charged to a charge level of, for example, 9 µC/g and are attracted to the photo-exposed areas on the drum surface 126 by the electric field between these areas and the negatively electrically biased developer so that the latent image becomes visible.

After development, the toner image adhering to the drum surface 126 is transferred to the moving paper web 112 by a transfer corona device 134. The moving web 112 is in face-to-face contact with the drum surface 126 over a wrapping angle ω of about 15° determined by the position of guide rollers 136. The transfer corona device, being on the opposite side of the web to the drum, and having a high potential opposite in sign to that of the charge on the toner particles, attracts the toner particles away from the drum surface 126 and onto the surface of the web 112. The transfer corona device typically has its corona wire positioned about 7 mm from the housing which surrounds it and 7 mm from the paper web. A typical transfer corona current is about 3 μA/cm web width. The transfer corona device 134 also serves to generate a strong adherent force between the web 112 and the drum surface 126, causing the latter to be rotated in synchronism with the movement of the web 112 and urging the toner particles into firm contact with the surface of the web 112. The web, however, should not tend to wrap around the drum beyond the point dictated by the positioning of a guide roller 136 and therefore there is provided circumferentially beyond the transfer corona device 134 a web discharge corona device 138 driven by alternating current and serving to discharge the web 112 and thereby allow the web to become released from the drum surface 126. The web discharge corona device 138 also serves to eliminate sparking as the web leaves the surface 126 of the drum.

Thereafter, the drum surface 126 is pre-charged to a level of, for example −580 V, by a pre-charging corotron or scorotron device 140. The pre-charging makes the final charging by the corona 128 easier. Any residual toner which might still cling to its surface may be removed at a cleaning unit 142 known in the art. The cleaning unit 142 includes an adjustably mounted cleaning brush 143, the position of which can be adjusted towards or away from the drum surface 126 to ensure optimum cleaning. The cleaning brush is earthed or subject to such a potential with respect to the drum as to attract the residual toner particles away from the drum surface. After cleaning, the drum surface is ready for another recording cycle. The cleaning unit 142 includes a rotatable cleaning brush 143 which is driven to rotate in a direction opposite to that of the drum 124 and at a peripheral speed of, for example twice the peripheral speed of the drum surface. The developing unit 132 includes a brush-like developer drum 133 which rotates in the same direction as the drum 124. The resultant rotational force applied to the drum 124 by the rotating developing brush 133 and the counter-rotating cleaning brush 143 is adjusted to be close to zero, thereby ensuring that the only rotational torque applied to the drum is derived from the adherent force between the drum 124 and the web 112. Adjustment of this resultant force is possible by virtue of the adjustable mounting of the cleaning brush 143 and/or the developing brush 133 and the brush characteristics.

Figure 2A:
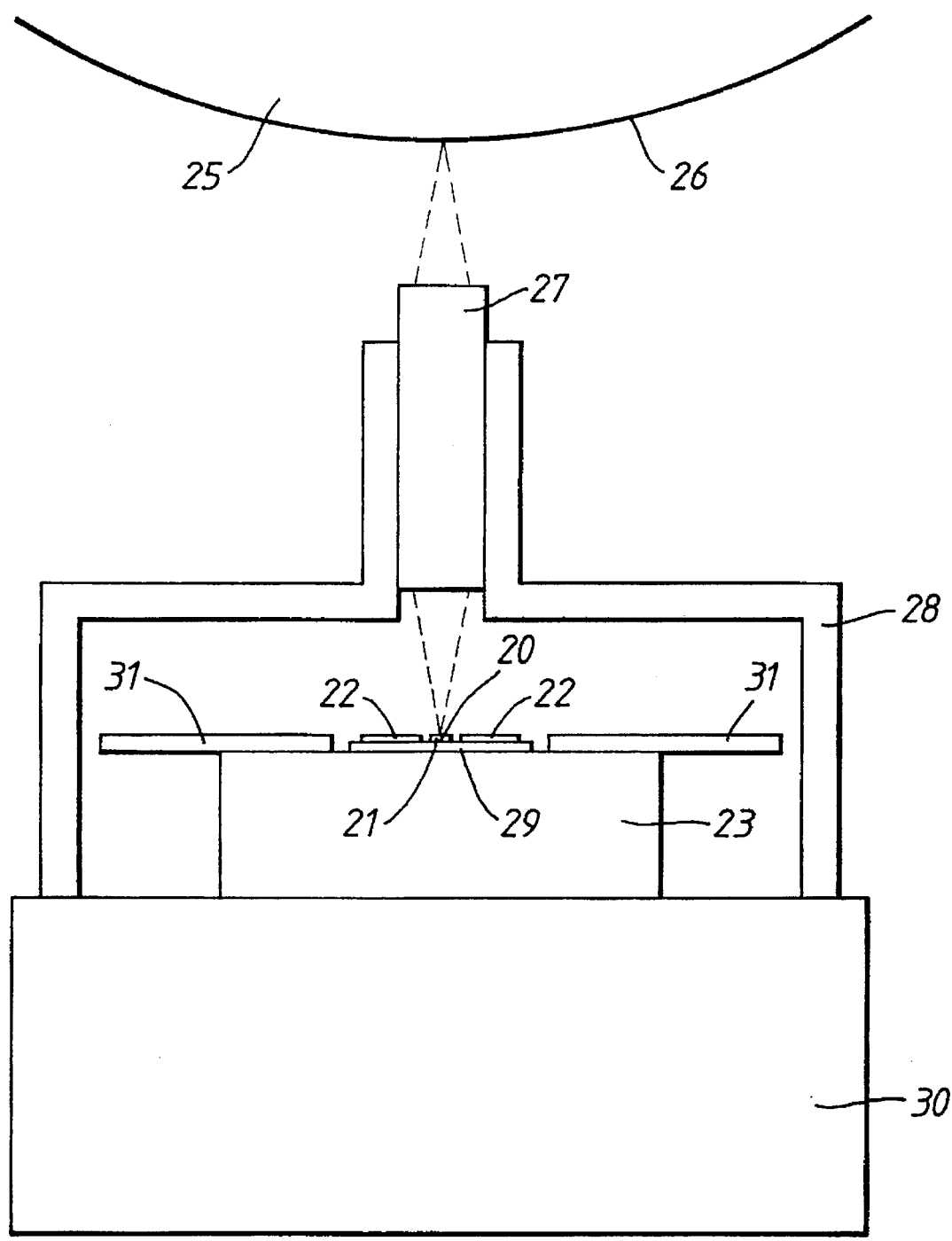
FIGS. 2a to 2e illustrate the working principles of a printer incorporating a linear array of recording sources referring to a preferred embodiment of the invention.

FIG. 2a shows a cross-sectional view of a preferred embodiment of a recording head incorporating a linear array of recording sources according to the invention. In this embodiment, the linear array of recording sources is a LED array which comprises a plurality of light emitting diodes (LEDs) 20 mounted on a metal carrier 23 using a module carrier 29 for each group of LEDs. An array of self-focusing fibres 27, such as is manufactured by Nippon Sheet Glass Co. Ltd under the trade-marked name "SELFOC", is secured by means of a protective and supportive cap 28 between the LEDs and the receptor 25, thus projecting the light emitted by the LEDs on the receptor surface 26. Both the metal carrier 23 and the cap 28 are attached to a supporting bar 30, said supporting bar providing mechanical stability and cooling (e.g. using water as a cooling fluid) to the recording head. A pair of interconnecting printed circuit boards 31 route the necessary control and data signals, through a connector (not shown), between the different parts of the recording head and other parts of the printer.

In this embodiment, the LEDs are part of a plurality of monolithic integrated circuits 21, each of such LED-chips comprising a plurality of LEDs. Within this chip, the LEDs are positioned on one row and are equally spaced apart. Each LED-chip 21 is accompanied by two semiconductor driver chips 22 wherein each of said driver chips provides an electronic circuit for controlling the subset of N LEDs of a recording module. In the example said subset comprises N=64 LEDs. The driver chips 22 are positioned on opposite sides of the LED-chips 21, wherein those on one side control the even numbered LEDs, while those on the other side control the odd numbered LEDs. Both the LED-chips 21 and the driver chips 22 are mounted, by means of adhesive bonding, on a module carrier 29. In the example, the recording head comprises 7424 LEDs, being divided over 58 LED-chips, each incorporating 2*N=128 LEDs. The number of subsets M thus equals 116. As the LED's centres are positioned 42.3 μm apart, the array of LEDs covers a recording width of 7424*0.0423=314 mm. Each subset of 64 even or odd numbered LEDs thus measures about 5.4 mm in length.

Figure 2B:
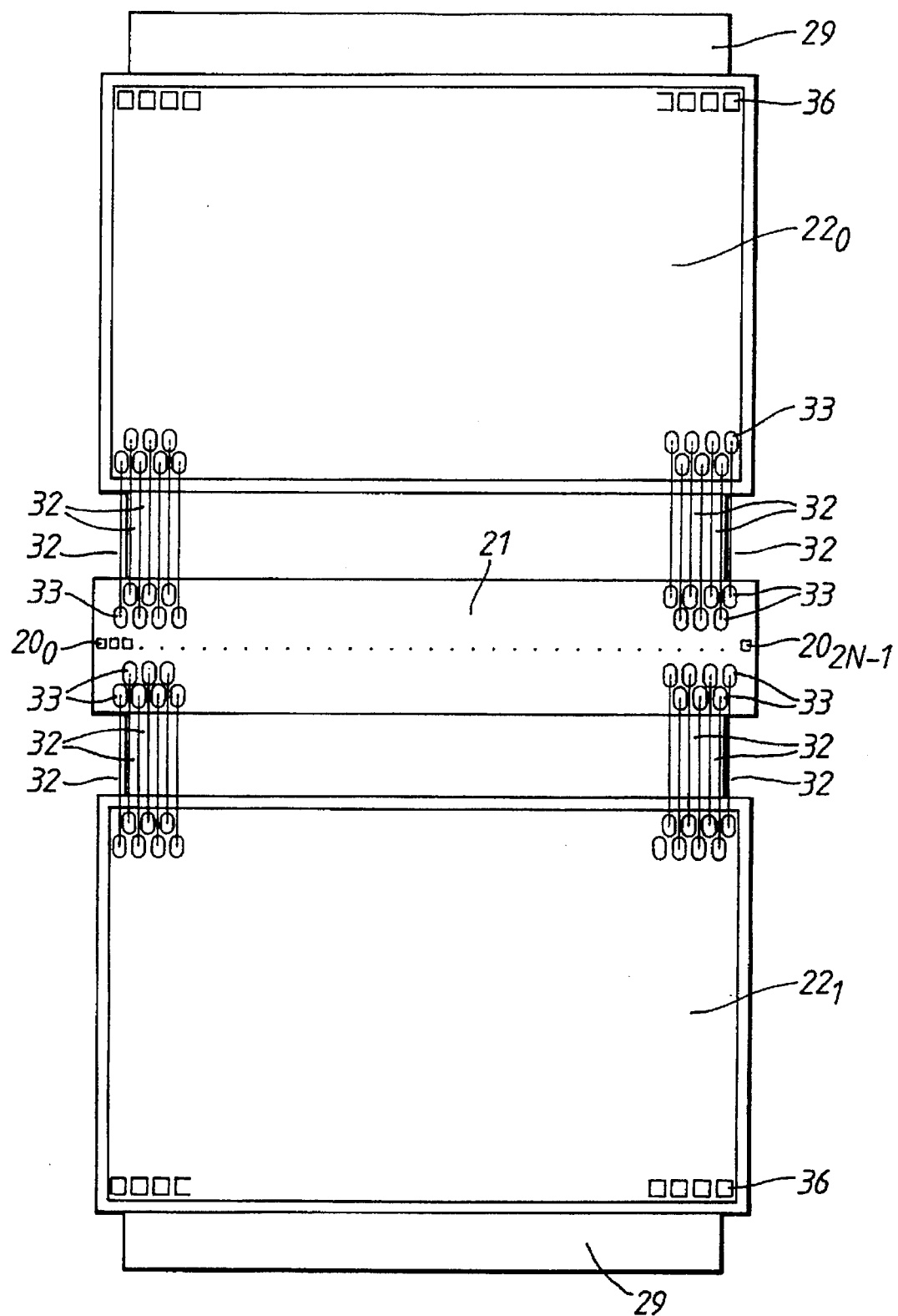

As is shown in FIG. 2b, a LED chip 21 incorporating 2*N LEDs numbered $20_0, \ldots, 20_{2N-1}$ together with its associated driver chips $22_0$ and $22_1$ are mounted on a module carrier 29. Each of the N outputs of the driver chips is connected to the corresponding LED by means of a wire bonding, materialized by wires 32 and bonding pads 33. By mounting a plurality of the thus formed mechanical subassemblies next to each other on a metal carrier 23, a linear array of recording sources of almost any length can be formed. Electrical connections to the said interconnecting printed circuit boards are made by means of wire bonding to bonding pads 36.

Figure 2C:
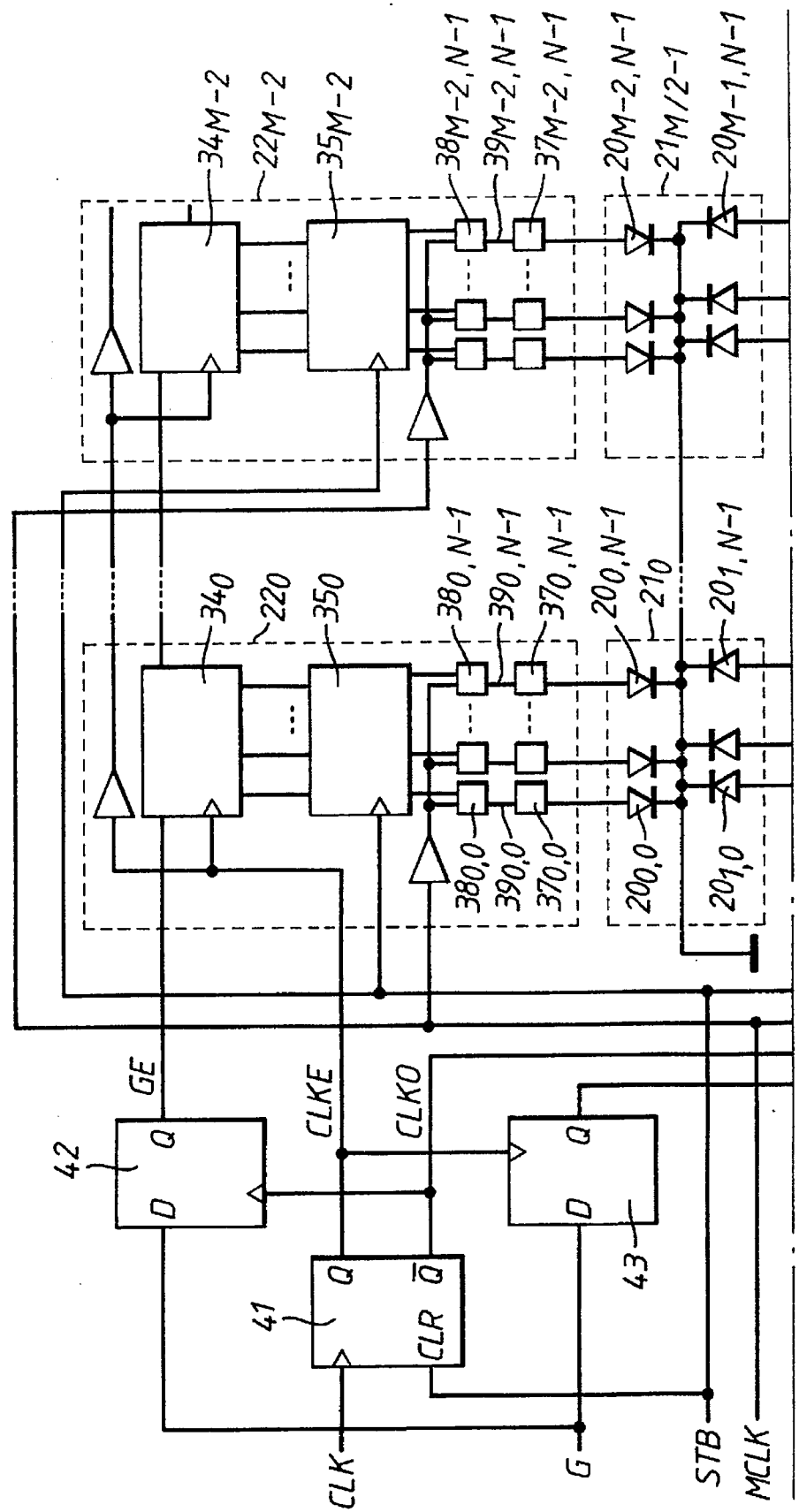

FIG. 2c shows a schematic of an electronic circuit controlling the above described recording head. When line-wise printing an image, a stream of n-bit gradation values $g_j$ for each of the individual spots of a line is received via signal G under control of a signal CLK. As such, each of said n-bit gradation values $g_j$ can represent $2^n$ different gradation levels. From the CLK-signal, divider 41 produces two signals CLKE and CLKO, being opposite in phase to each other and having a frequency that equals half the frequency of the CLK-signal. With each rising edge of the signals CLKE and CLKO, the n-bit registers 43 and 42 latch the next odd, respectively even gradation value being received. Under control of the CLKE signal, the gradation values for the even spots are then shifted into n-bit wide and N positions long shift registers $34_0, 34_2, \ldots, 34_{M-2}$ of driver chips $22_0, 22_2, \ldots, 22_{M-2}$, the CLKO signal controls the shifting of the gradation values of the odd spots into the shift registers $34_1, 34_3, \ldots, 34_{M-1}$ of driver chips $22_1, 22_3, \ldots, 22_{M-1}$. Once the gradation values for all the spots of a single line of the image to be printed are shifted in said shift registers 34, a pulse on the STB-signal latches all gradation values in the n * N positions large latch registers $35_0, \ldots, 35_{M-1}$ so that the next line of gradation values can be transferred to the shift registers 34. Once a line of gradation values is loaded in latch registers 35, modulators $38_{0,0}, \ldots, 38_{M-1,N-1}$ will, under control of the signal MCLK, produce M*N control signals $39_{0,0}, \ldots, 39_{M-1,N-1}$ that enable the current sources $37_{0,0}, \ldots, 37_{M-1,N-1}$ to deliver a constant current to the LEDs $20_{0,0}, \ldots, 20_{M-1,N-1}$ for a period of time proportional to the gradation value of the respective spot. The light energy thus emitted by LEDs 20 will, projected by the linear lens shown in FIG. 2a, line-wise, and in relation to the respective gradation values, discharge the pre-charged photoconductive receptor surface (also shown in FIG. 2a), thereby producing a latent image on said receptor surface. It is considered well known to those skilled in the art that the even driver chips $22_0$, $22_2$, ..., $22_{M-2}$ and the odd driver chips $22_1$, $22_3$, ..., $22_{M-1}$ can be made identical although they shift the gradation data in another direction. Each of the drivers therefore is fed with a direction control signal (not shown) which controls the operation of the shift register 34.

Figure 2D:
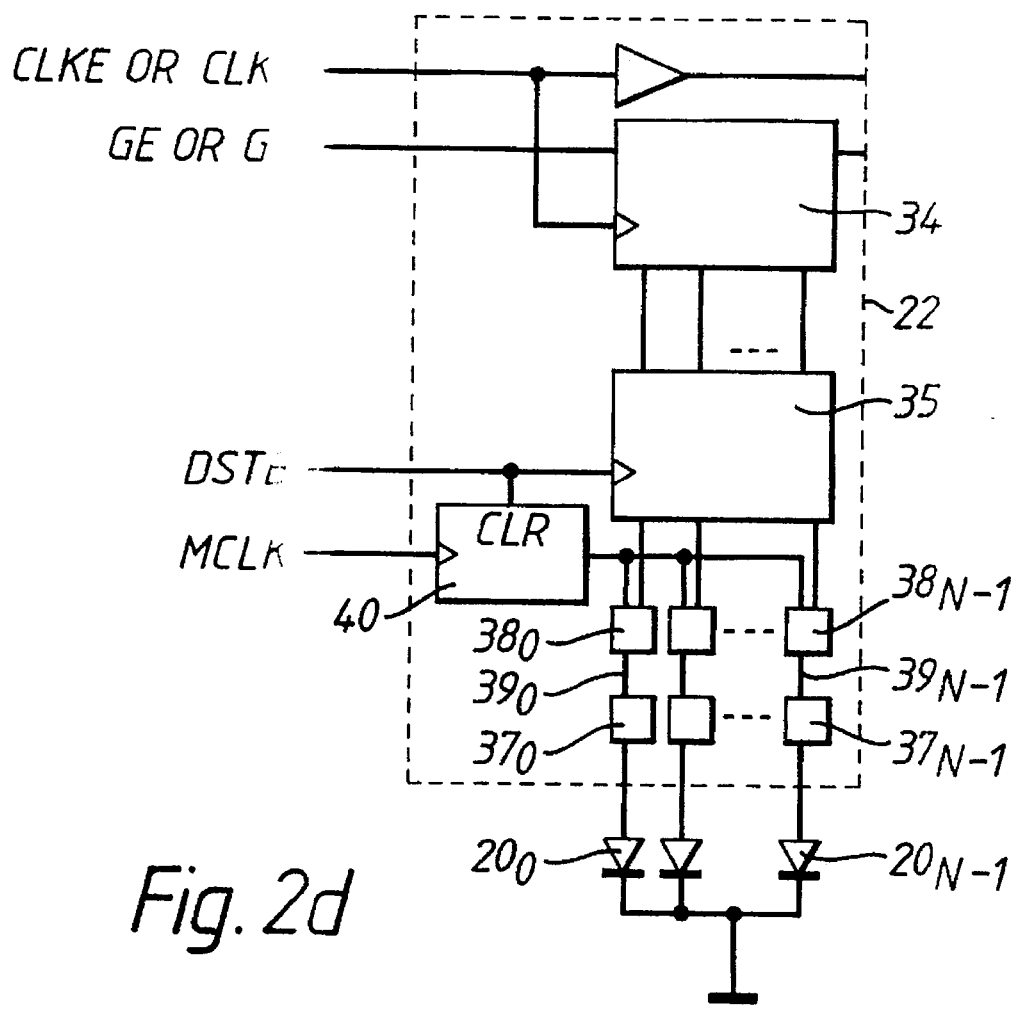
Figure 2E:
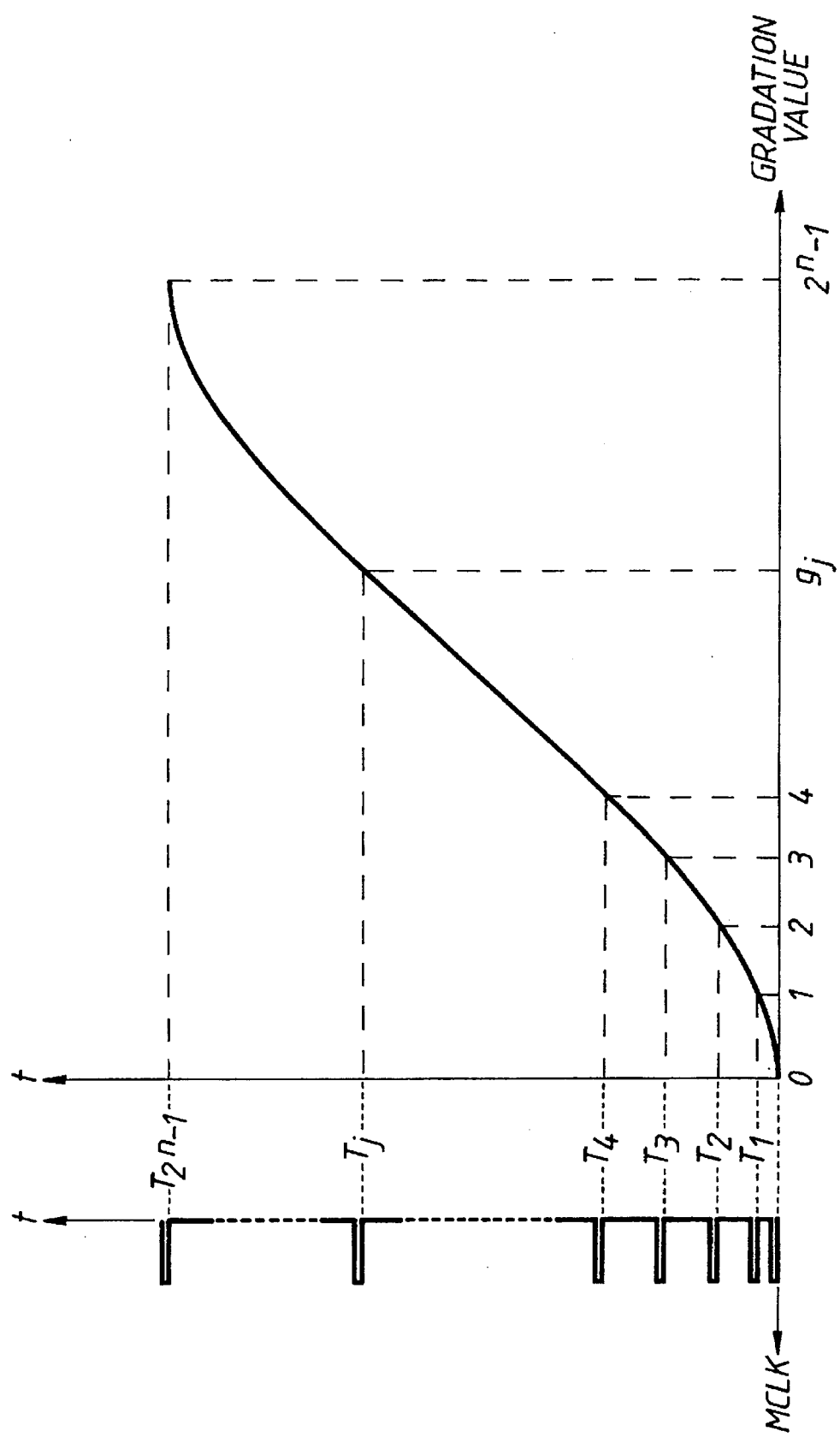

Preferably, as is shown in FIG. 2d, each subset of N modulators comprises a single counter 40, which for each line to be printed counts up from 0 to $2^n-1$ under control of the signal MCLK, and N individual comparators $38_0$ ... $38_{N-1}$, said comparators enabling current sources $37_0$ ... $37_{N-1}$ to operate as long as the counter's value is less than the gradation value $g_j$ presented by the latch register 35. As such, the comparators act as pulse-width modulators that produce control signals $39_0$ ... $39_{N-1}$ the pulse width $T_j$ of which is proportional to the respective gradation value $g_j$. The pulse width of the respective control signal equals the sum of the first $g_j$ periods of the signal MCLK. Preferably, said signal MCLK is generated by means of a programmable clock generator circuit (not shown), which actually controls the relation between a spot's gradation value and the associated LED's operative time (see FIG. 2e).

Figure 3:
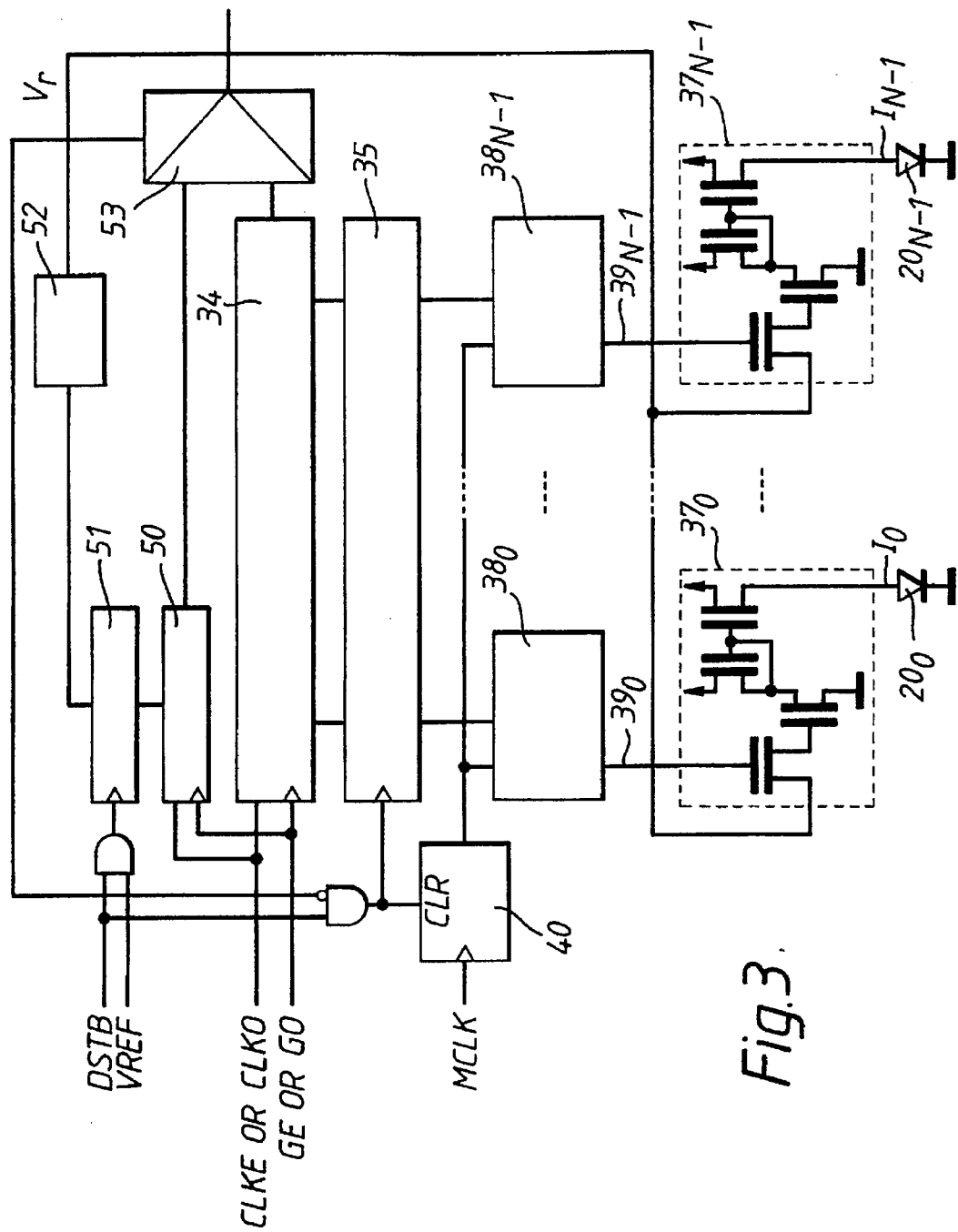
FIG. 3 illustrates a preferred embodiment of the first correction means.

As is shown in FIG. 3, the current sources $37_0$ through $37_{N-1}$ of each recording module are preferably constructed by means of a current mirror circuit. Said current mirror produces, under control of the control signals $39_0$ ... $39_{N-1}$, a constant current $I_i$ to the respective LED, said current $I_i$ being proportional to an analog reference voltage $V_r$. In order to set the average energy level of a series of N recording sources of a recording module to a predetermined reference level, each driver chip comprises a second m-positions long shift register 50 and a second m-bit wide latch register 51 connected to a digital-to-analog converter 52, which outputs said voltage $V_r$: Before printing an image, and while asserting the signal VREF, a series of said first m-bit correction factors representing the appropriate reference voltage of each driver chip is, like the gradation values, shifted into said second shift register 50 and transferred to the latch register 51. By consequence, the digital-to-analog converter 52 will feed the respective reference voltage $V_r$ to all N current sources of each driver chip, thereby controlling the average energy level produced by each subset of N recording sources. The signal VREF enables the operation of the latch register 51 as well as switches multiplexer 53 which allows the shift registers 50 of each driver chip to be cascaded.

Figure 4A:
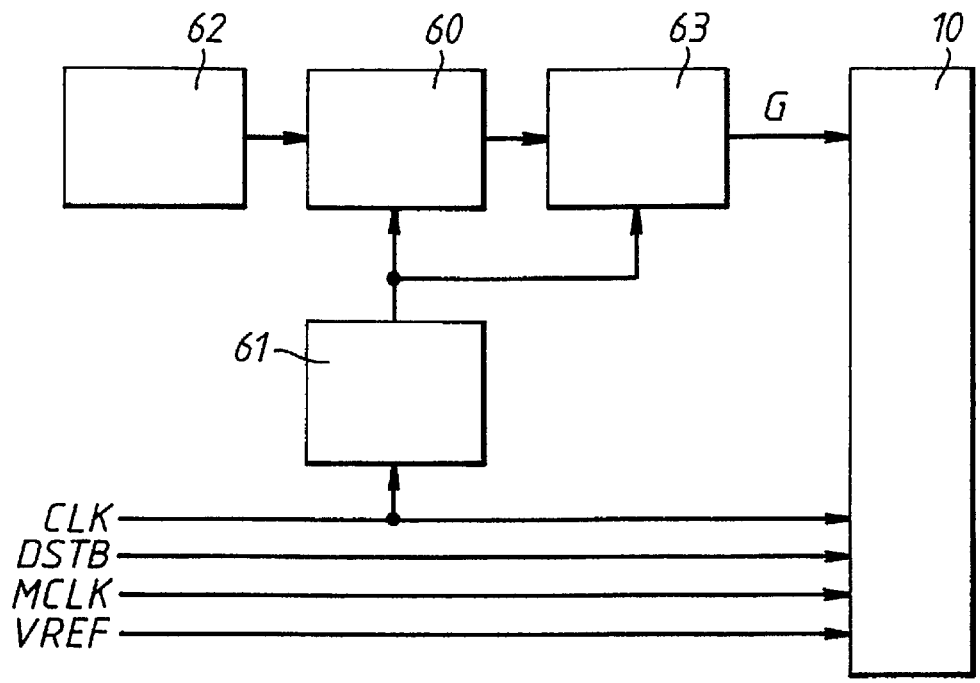
FIGS. 4a and 4b illustrate the principles of the second correction means referring to two preferred embodiments of said second correction means.

With reference to FIG. 4a, the operating principles of said second correction means are now described.

In order to record an image stored as a two-dimensional array of gradation values in the image memory 60, a pixel counter 61 and a line counter 62 retrieve from said image memory, line after line and pixel after pixel, the gradation values $g_j$ of each pixel. Correction look-up table 63 then translates each gradation value $g_j$ into a gradation value $g_j'$, the latter being the gradation value that, when being applied to the respective LED, produces a spot with an optical density that most closely matches the optical density of a spot recorded by means of a said reference LED when said reference LED is recording a pixel with the same gradation value $g_j$. Signal G then carries said corrected gradation values $g_j'$ towards the recording head 10, as described with reference to FIG. 2b. The function of the correction look-up table 63 will now be described more theoretically.

Let $E_{i,j}$ be the amount of optical energy emitted by the i-th LED when being driven with a current $I_i$ during a period of time $T_j$. If we define that the function f, characteristic to the pulse width modulator controlling the LED, expresses the relation between a gradation value $g_j$ and $T_j$, so that $T_j=f(g_j)$, it is clear that $$E_{i,j}=k_i*I_i*T_j=k_i*I_i*f(g_j), \quad (1)$$

wherein $k_i$ characterises the LED's efficiency as well as the attenuation of the respective part of the lens. As explained above, $E_{i,j}$ can vary from LED to LED due to variations of the current $I_i$ as well as the factor $k_i$. We also define $E_{r,j}$ as the amount of optical energy emitted by a reference LED when being driven with a current $I_r$ during a period of time $T_j$. As we can say that $$E_{r,j}=k_r*I_r*T_j, \quad (2)$$

the relative strength of the i-th LED can now be expressed by a factor $K_i$, whereas:

$$K_i=E_{i,j}/E_{r,j}=(k_i*I_i)/(k_r*I_r). \quad (3)$$

This factor will be smaller than one for LEDs emitting less energy than the reference LED, it will be greater than one for LEDs emitting more energy than the reference LED. The above equation can also be written as:

$$E_{r,j}=E_{i,j}/K_i=k_i*I_i*(T_j/K_i). \quad (4)$$

When comparing this equation to equation (1) it is clear that, for each LED i and for each gradation value $g_j$, one can correct the unevenness of the optical energy emitted by a LED by means of multiplying the period of time said LED is activated by a factor $1/K_i$. We can however rewrite equation (4) as:

$$E_{r,j}=E_{i,j}/K_i=k_i*I_i*f\{f^{-1}(f(g_j)/K_i)\}, \quad (5)$$

or $$E_{r,j}=E_{i,j}/K_i=k_i*I_i*f(g_j'). \quad (6)$$

These last two equations can be read as follows; in order for each LED i to emit for each gradation value $g_j$ the same amount of energy $E_{r,j}$, the gradation value $g_j$ shall first be translated into a period of time $T_j$; this period of time is then multiplied by $1/K_i$ after which it is translated back into a corrected gradation value $g_j'$ (the modulator means shall then of course apply the function f to this gradation value $g_j'$ so as to assert a LED controlling signal during a period of time $T_j'$).

It is clear that weaker LEDs have a correction factor $K_i$ smaller than one so that for these LEDs $g_j'$ is larger than $g_j$, and consequently $T_j'$ is larger than $T_j$. If we assume that the weakest LED has a correction factor $K_w$, the maximum non-corrected time $T_m$ any LED can be activated while still allowing the weakest LED to be corrected, equals $T_1*K_w$ ($T_1$ is defined as the maximum time any LED is allowed to be activated, said time typically equalling the time needed to image a single line of spots). It is thus clear that the smaller $K_w$ is, the smaller this time $T_M$ is, and the more periods of time as well as the more gradation values are lost for correction purposes. It is therefore an object of the first correction means to ensure that the average amount of energy emitted by the LEDs of each subset of LEDs equals the amount of energy emitted by the reference LED so that the non-uniformities of these average energy levels do not add to the non-uniformity levels of the energy emitted by the individual LEDs.

The correction look-up table 63 of FIG. 4a performs the above described computation of $g_j'$ in one cycle. It therefore contains a two-dimensional array of gradation values $g_j'$, each position in said array being addressable by a combination of a gradation value $g_j$ and a LED number i. However, this approach typically leads to an extremely large correction look-up table. In the example, it contains 7,424*256 =1,900,544 8-bit gradation values.

Figure 4B:
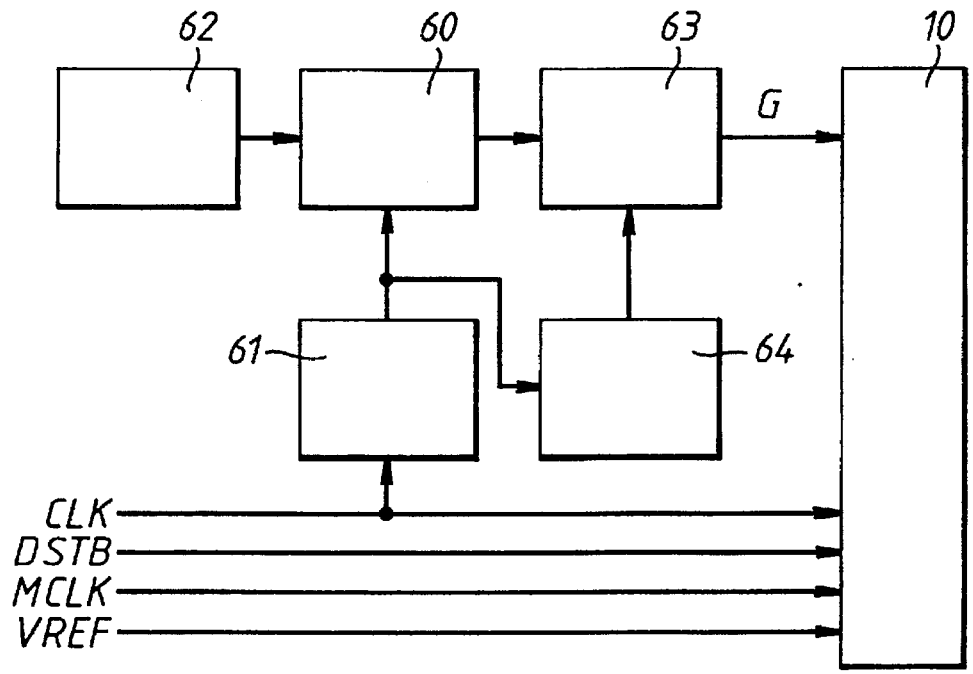

Therefore, in a more preferred embodiment of the said second correction means, which is illustrated in FIG. 4b, an indirect correction approach is introduced. According to this embodiment, the LEDs are, based upon their correction factor $K_i$, classified in a plurality of classes, each of such classes comprising LEDs having about the same factor $K_c$, being the average of all factors $K_i$ of said class. Every LED is now corrected using the correction factor $K_c$ of the class to which the respective LED belongs. The circuit therefore contains a classification table 64 which contains the class number c of each LED. The correction look-up table 63, as opposed to the previous embodiment, now contains a two-dimensional array of gradation values $g_j'$, each position in said array being addressable by a combination of a gradation value $g_j$ and a class number c. In the example there are $2^8=256$ classes so that the classification table 64 holds 7424 8-bit values while the correction look-up table 63 now only contains 256*256 =65,536 8-bit gradation values.

If however, the period of time $T_j$ is linearly proportional to the gradation value $g_j$, the above described correction is even more simplified so that the correction look-up table can optionally be replaced by a multiplying circuit that directly computes $g_j'$ as this now equals $g_j/K_c$.

A similar method can be employed to correct for unevenness in the longitudinal direction, as will be described with reference to FIGS. 6a and 6b.

Figure 5A:
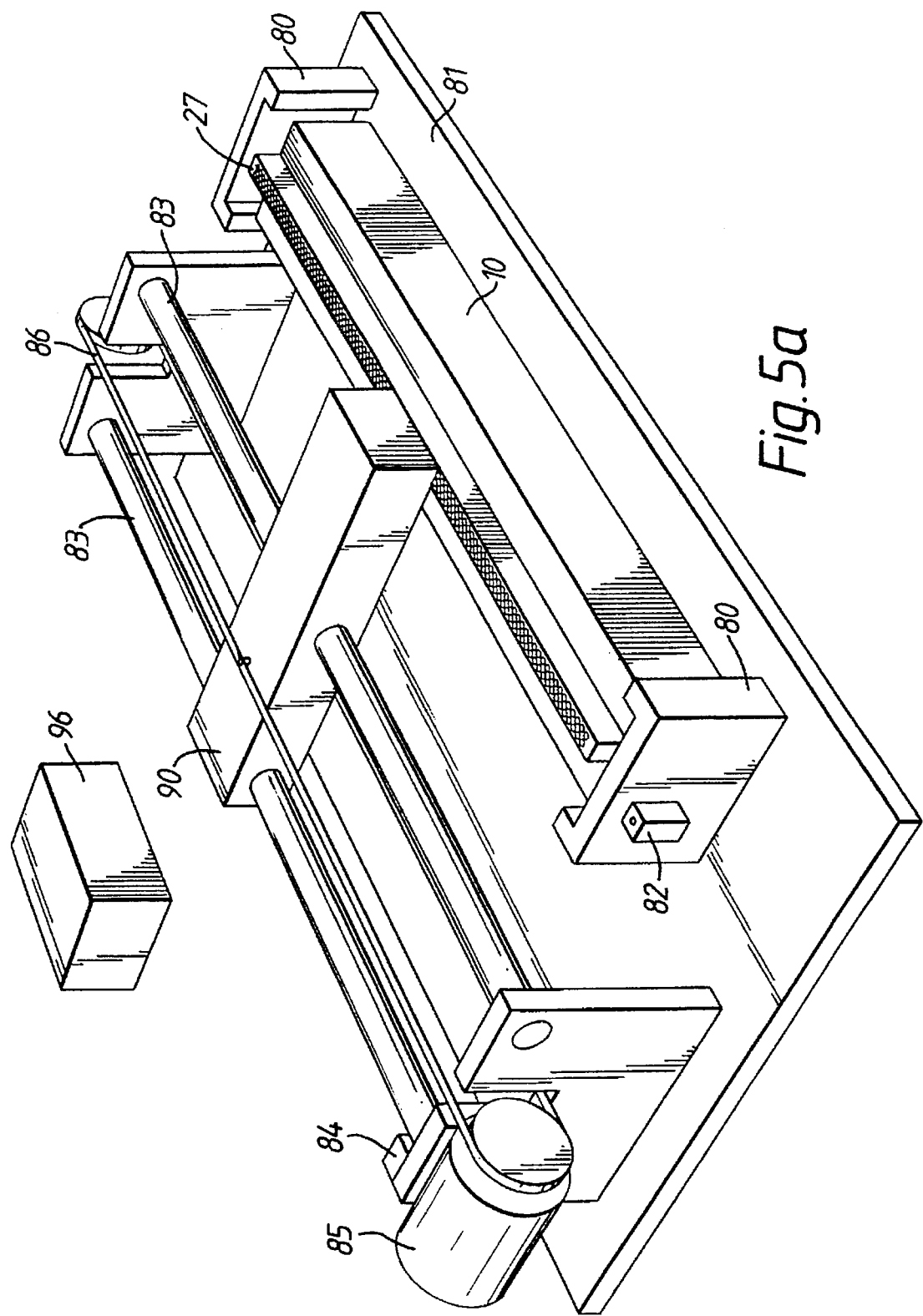
FIGS. 5a and 5b show a preferred embodiment of a means for measuring the non-uniformities of the energy levels produced by one or more recording sources.
Figure 5B:
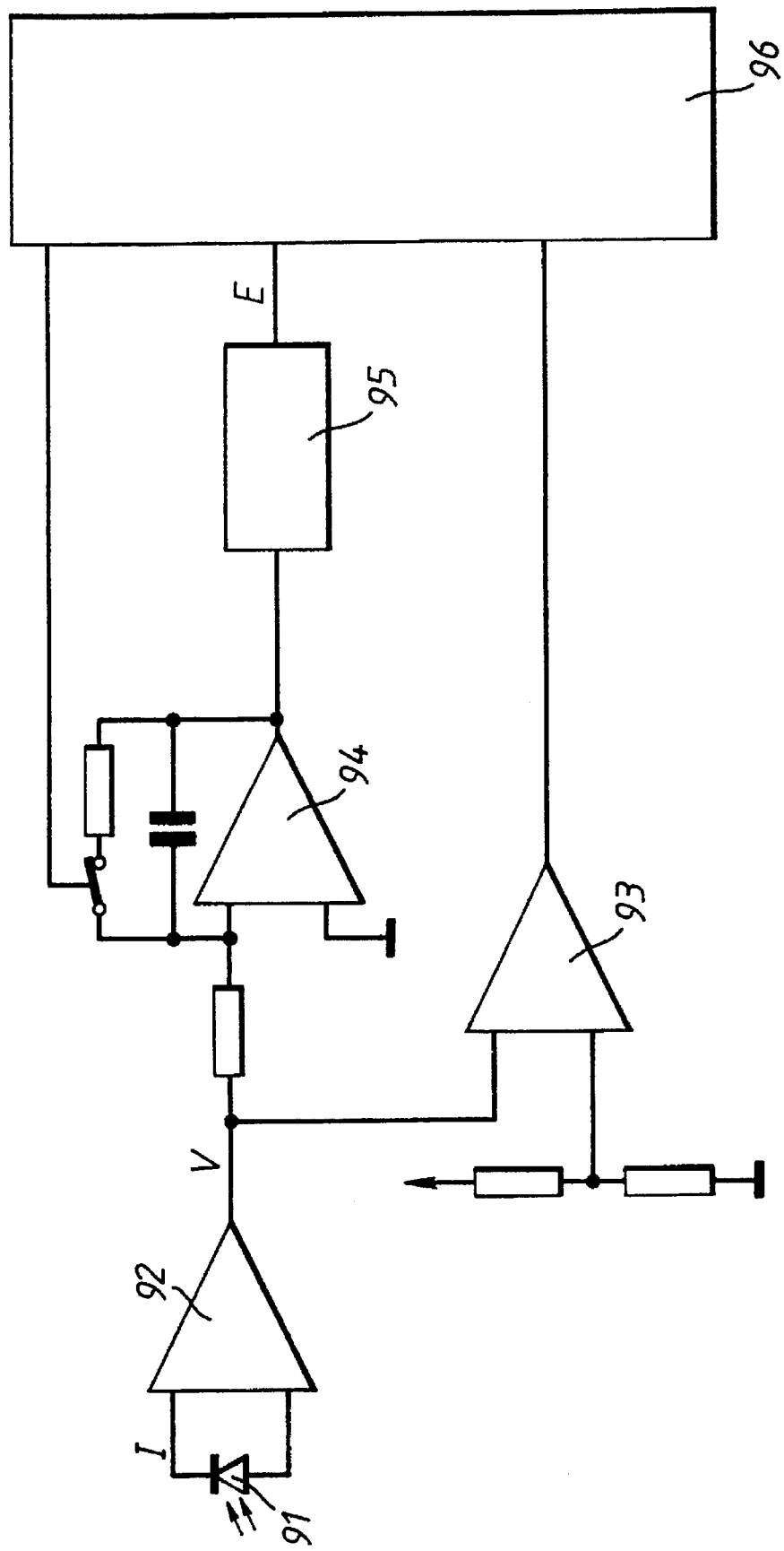

Referring now to the apparatus illustrated in FIGS. 5a and 5b, a preferred method for measuring the non-uniformity of the energy levels produced by the recording sources is described. In FIG. 5a, a recording head 10 comprising said linear array of LEDs as described above, is shown being positioned in a pair of guides 80 which are mounted on a base plate 81. The recording head is positioned with the lens 27 pointing upwards. Also mounted on said guides is a reference LED 82, also pointing upwards, and one or more rails 83 that allow an optical detector 90 to be moved in parallel with the recording head, the left-most position of said optical detector 90 being detected by means of a micro-switch 84. A low-power direct current motor 85 controls, by means of a metal wire 86, the movement of the optical detector 90 along the length of the recording head. The optical detector itself comprises, as shown in the schematic of FIG. 5b, a photo-diode 91, a linear amplifier 92, a comparator 93, an integrator 94 and a analog-to-digital converter 95. A digital control unit 96 generates the necessary signals to operate the reference LED 82, the optical detector 90 and the motor 85, while providing means to generate and store any combination of gradation values for all LEDs of the array, as well as means to repeatedly send said gradation values to the recording head thereby simulating the forming of an image by said recording head. It also comprises computing means for deriving from the digital signal E, being generated when said image is being formed by means of said recording head, correction factors to be used by said first and second correction means.

Assuming the recording head has the characteristics as described above, the length of the photo-diode 91, measured parallel to the direction of the array of LEDs, is 8 mm. As such, it is able to detect the light of all 64 LEDs of a subset without needing to be moved. As the mechanical construction assures that the photo-diode is always more or less in the focal point of the underlying LEDs, the photo-diode catches all light emitted by the respective LEDs. In the following description, it will be assumed that the LEDs are numbered 0 to 7423, with LED 0 being the left-most LED, and that the LED-chips are numbered 0 to 57, again with chip 0 being the left-most.

In the present invention, the above described apparatus is used firstly to measure the unevenness in the average light energy emitted by each subset of 64 LEDs, and secondly to measure the unevenness of the light energy emitted by the individual LEDs. From these measurements, correction factors to be used by the first and second correction means are derived.

Firstly, the digital control unit will calibrate the optical detector in order to compensate for drifts of its characteristics due to ageing or temperature changes. For this purpose, the detector is positioned above the temperature compensated reference LED 82, which is then driven with a constant current during a precisely controlled period of time $T_j$. The photo-diode 91 thus generates a current I which is sensed and amplified by means of amplifier 92. The resulting voltage V is integrated by means of integrator 94 over said period of time in order to filter any noise present in the respective signals. The analog-to-digital converter 95 then converts the resulting voltage into an n-bit digital signal E. It is clear that said digital signal represents a value $E_{r,j}$ which is proportional to the amount of light energy emitted by said reference LED.

In order to measure the unevenness in the average light energy emitted by each subset of 64 LEDs, the optical detector is first positioned right over the first subset of 64 even numbered LEDs. The digital control means generates and stores in its line buffer, a line-wide pattern of gradation values, wherein the gradation value at position k equals the maximum gradation value while all others are zero. It then repeatedly sends these gradation values to the recording head, causing the k-th LED to be lit, while it moves the detector from its left-most position to the right. As soon as the right edge of the photo-diode is over the respective LED, the voltage V will rise which causes comparator 93 to toggle, and the motor to be halted. It is now clear that k is chosen so that, when the motor comes to a stop, the centre of the photo-diode will be positioned right over the centre of the first subset of 64 LEDs. As soon as the optical detector is in the correct position, the digital control unit will generate and store in its line buffer, a line-wide pattern wherein the gradation values of the first 64 even-numbered positions equal a value g, while all others are zero. It will then use Newton's regula falsi iterative method to search the reference voltage $V_r$, at which the value of the signal E most closely matches 64 times the value of $E_{r,j}$, said signal E being sampled only after having sent the contents of the line buffer a predetermined number of times to the recording head in order to light the first subset of LEDs. It will then store a said first correction factor, being the digital value that was down-loaded into the respective driver chip's second latch register at the moment the match was found, in the said first correction storage means. The same iterative method is then repeated, without moving the optical detector, for the second subset comprising the first 64 odd numbered LEDs.

After repeating the processes of moving the optical detector to the next two subsets of 64 LEDs and searching the said first correction factors for said two subsets of LEDs 58 times, the first correction storage means will contain all correction factors for applying said first correction to the respective subsets of LEDs. Of course, in order to be able to position the optical detector over the last two subsets of LEDs, the position k is then chosen so that when the now left edge of the photo-diode is above the k-th LED, the motor is halted.

In order now to measure the unevenness of the optical energy emitted by the individual LEDs, the first correction is applied to each of the 116 subsets of 64 LEDs, and the optical detector is again moved to its left-most position. Using a similar positioning mechanism as during the first series of measurements, the optical detector is now moved from LED 0 to LED 7423.

For each LED i however, the digital control means will generate, and store in its line buffer, a line-wide pattern of gradation values wherein the gradation value at position i equals a gradation value $g_j$ while all others are zero. It will then reset the integrator 94 and send the contents of the line buffer for a predetermined number of times to the recording head in order to light the respective LED. After this, the signal E will represent the value $E_{i,j}$, being the amount of energy emitted by LED i when recording the gradation level $g_j$, and from this value, $K_i = E_{i,j}/E_{r,j}$ is computed and stored in said second correction storage means.

Figure 6A:
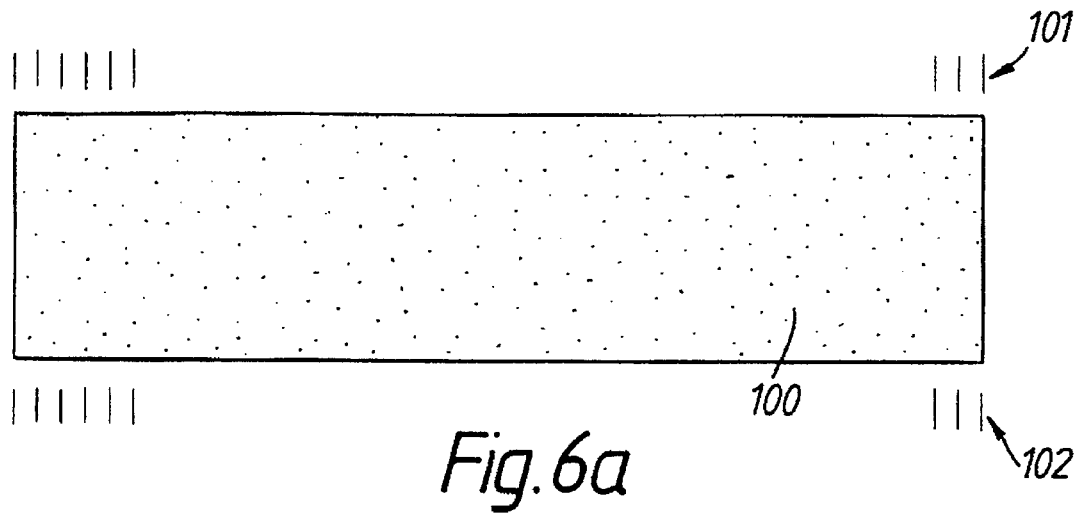
FIG. 6a and 6b show a preferred set of test images to be used in order to correct for unevenness of the optical density of images to be printed to be used in generating the third correction factors.

With reference to FIG. 6a, the said third correction means is now described in more detail. In order to detect bands or stripes that are introduced by the developing, transfer and/or fixing processes, the test pattern of FIG. 6a is printed by means of a recording head wherein the recording sources are already corrected by means of said first and second correction means. As illustrated, the pattern contains a laterally disposed solid rectangular area 100 and leading and trailing areas 101, 102 with marks. With perfect optics and mechanics, the use of only one of the areas of marks 101, 102 alone would be sufficient. The solid area 100 comprises multiple lines of spots wherein each spot has, before being corrected by said second correction means, a gradation value $g_j$. The other areas 101, 102 comprise multiple lines of a pattern wherein to every one out of p spots is assigned a non-zero gradation value. As such the marks indicate with which LED each specific part of the solid area is printed. This pattern is then scanned by means of a microdensitometer or an image scanner as used in the graphic arts, which measures the profile of the optical density along the full length of the solid area.

Figure 6B:
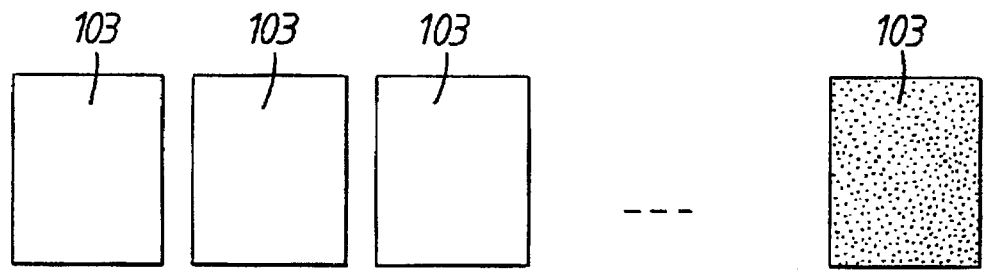

Also scanned Also scanned is the pattern illustrated in FIG. 6b wherein each solid block 103 comprises spots having one of a predetermined series of gradation values. From the latter measurement the function h defining the relation between the gradation value g and the optical density D can be derived. The former measurement produces an average optical density reading $D_{r,j}$ as well as, for every LED i of the recording head, an optical density reading $D_{i,j}$. From this data, using a method similar to the one described with reference to FIG. 4a, a series of correction factors $L_i$ is computed, with which the operative time of each individual LED should be adjusted in order to produce an image with no undesired unevenness of the optical density. The thus obtained correction factors $L_i$ are then applied to the gradation values for each spot to be printed by a third correction means which operates exactly in the same way as the second correction means. Said third correction means is preferably integrated in said second correction means by multiplying them with the already determined second correction factors $K_i$ to thereby produce a new series of combined correction factors $K_i'$ which can be applied to the gradation values of an image by means of said second correction means.

Although FIGS. 6a and 6b show a laterally disposed pattern, the print of which is scanned in the lateral direction, it is also possible to print a longitudinally disposed pattern and scan the resulting print in the longitudinal direction to detect periodic unevenness in the longitudinal direction. It is clear that the marks 101, 102 are then indicative of the angular position of the cylindrical parts of the said rendering means. From the measurement of the profile of the optical density of the solid rectangular area 100, a set of correction factors $L_k'$ can be computed using the same method as described above. In order to apply said correction, the pulses output by encoder means that are indicative of the angular displacement of each of said cylindrical parts are counted using a ring counter. The output of said ring counter is then used to select one of the correction factors $L_k'$ so as to correct the gradation values of the respective image lines to be printed.

CROSS REFERENCE TO CO-PENDING APPLICATIONS

A number of features of the printers described herein are the subject matter of:

co-pending patent application no . . . entitled "Electrostatographic single-pass multiple-station printer", (attorney's reference 4/Tower/1112D),:

co-pending patent application no . . . entitled "Electronic circuit for gradation controlling recording sources arranged in a linear array", (attorney's reference 2/Leddriver/1122D), co-pending patent application no . . . entitled "LED recording head", (attorney's reference 8/Ldaassembly/1128D), co-pending patent application no . . . entitled "Temperature controlled LED recording head", (attorney's reference 8A/Ldacooling/1131D), filed on even date herewith.

We claim:

1. A non-impact printer for forming an image on a medium, which printer comprises:

a linear array of recording sources for forming a multigradation latent image on a receptor surface, said linear array comprising a plurality of sub-sets of recording sources;

means for developing said latent image into a visual image;

means for transferring said visual image onto said medium;

first correction storage means for storing first correction factors derived from measurements of non-uniformity of average energy output of said recording sources of said sub-sets of recording sources;

first correction means for applying, for each sub-set of recording sources, said first correction factors;

second correction storage means for storing second correction factors derived from said measurements of non-uniformities of energy being output by each one of said individual recording sources, after said first correction factors have been applied; and second correction means for applying said second correction factors after applying said first correction factors.

2. A printer according to claim 1, including means for measuring the average energy output of each of said sub-sets of recording sources.

3. A printer according to claim 1, including means for measuring the energy output of each individual one of said recording sources.

4. A printer according to claim 1, which further comprises:
   third correction storage means for storing third correction factors derived from a measurement of unevenness of optical density of a printed image printed after the application of said first and second correction factors; and
   third correction means for providing a correction of the unevenness of the optical density of the image to be printed according to said stored third correction factors.

5. A printer according to claim 4, including means for measuring the optical density of said printed image printed after the application of said first and second correction factors.

6. A printer according to claim 1, wherein said recording sources comprise a source of constant current as a current mirror circuit and said current mirror circuit produces a current for a respective recording source, which current is proportional to a reference selected from a reference current and a reference voltage.

7. A printer according to claim 1, wherein said second correction means corrects gradation data for each recording source according to a the respective said second correction factor.

8. A printer according to claim 1, wherein said second correction storage means comprises a look-up table storing, for each gradation value and for each recording source, a corrected gradation value derived from said second correction factors.

9. A printer according to claim 7, wherein said second correction storage means comprises:
   (i) a first look-up table storing recording source class numbers, and
   (ii) a second look-up table storing, for each gradation value and for each recording source class number, a corrected gradation data value derived from said second correction factors.

10. A printer according to claim 1, wherein said first correction means comprises for each sub-set of recording sources a shift register for transferring the said first correction factors to a latch register temporarily storing said first correction factors, while applying the first correction factors to a digital-to-analog converter generating a reference selected from a reference current and a reference voltage, which reference controls the average energy level output by said subset of recording sources.

11. A printer according to claim 1, wherein said first correction storage means comprises a non-volatile memory.

12. A printer according to claim 1, wherein said second correction storage means is in comprises a non-volatile memory.

13. A method of adjusting a non-impact printer for forming an image on a medium, which printer comprises:
   a linear array of recording sources for forming a multi-gradation latent image on a receptor surface, said linear array comprising a plurality of sub-sets of recording sources;
   means for developing said latent image into a visual image;
   means for transferring said visual image onto said medium;
   the method comprising the steps of:
   measuring average energy output of each of said sub-sets of recording sources;
   generating and storing first correction factors derived from measurements of non-uniformity of the energy output of said sub-sets of recording sources;
   applying, for each sub-set of recording sources, said first correction factors;
   measuring energy output of each individual one of said recording sources;
   generating and storing second correction factors derived from said measurements of non-uniformity of the energy output of each individual one of said recording sources; and
   applying said second correction factors after applying said first correction factors.

14. A method according to claim 13, further comprising the steps of:
   printing one or more images of an optical density after the application of said first and second correction factors;
   measuring unevenness of optical density of said or more printed image;
   generating and storing third correction factors derived from the unevenness of the optical density of said at least one printed image; and
   providing a correction of the unevenness of the optical density of the image to be printed according to said stored third correction factors.

15. A method according to claim 14, wherein said third correction factors are combined with said second correction factors to produce combined correction factors.

16. A non-impact printer for forming an image on a medium, which printer comprises:
   a linear array of recording sources for forming a multi-gradation latent image on a receptor surface, said linear array comprising a plurality of sub-sets of recording sources;
   means for developing said latent image into a visual image;
   means for transferring said visual image onto said medium;
   means for storing correction factors $K_i$ derived from measurements of non-uniformity of each individual one of said recording sources; and
   correction means for applying said correction factors;
   wherein said recording sources are classified in a plurality of classes, based upon their respective correction factor $K_i$, each of such classes comprising recording sources having about a same factor $K_c$, and each recording source is then corrected using said correction factor $K_c$, which is representative for all recording sources of the class to which that recording source belongs.

17. A method according to claim 13, wherein said recording sources are classified in a plurality of classes, based upon respective said second correction factors thereof, each of such classes comprising recording sources having about a same factor $K_c$, which is representative for all recording sources of the class to which that recording source belongs.

18. A recording head comprising:
   a linear array of recording sources for forming a multi-gradation latent image on a receptor surface, said linear array comprising a plurality of sub-sets of recording sources;
   first correction storage means for storing first correction factors $K_i$ derived from measurements of non-uniformity of average energy output of said recording sources of said sub-sets of recording sources;

first correction means for applying, for each sub-set of recording sources, said first correction factors;

second correction storage means for storing second correction factors derived from said measurements of non-uniformities of energy being output by each one of said individual recording sources, after said first correction factors have been applied; and second correction means for applying said second correction factors after applying said first correction factors.

19. A recording head according to claim 18, which further comprises:

third correction storage means for storing third correction factors derived from a measurement of unevenness of optical density of the a printed image printed after application of said first and second correction factors; and third correction means for providing a correction of the unevenness of the optical density of an image to be printed according to said stored third correction factors.

20. A method of adjusting a recording head, which recording head comprises a linear array of recording sources for forming a multi-gradation latent image on a receptor surface, said linear array comprising a plurality of sub-sets of recording sources, the method comprising the steps of:

measuring average energy output of each of said sub-sets of recording sources;

generating and storing first correction factors derived from said measurements of non-uniformity of energy output of said sub-sets of recording sources;

applying, for each sub-set of recording sources, said first correction factors;

measuring energy output of each individual one of said recording sources;

generating and storing second correction factors derived from measurements of non-uniformity of energy output of each individual one of said recording sources; and applying said second correction factors after applying said first correction factors.

* * * * *

UNITED STATES PATENT AND TRADEMARK OFFICE
CERTIFICATE OF CORRECTION

PATENT NO. : 5,640,190

DATED : June 17, 1997

INVENTOR(S) : Bollansee et al.

It is certified that error appears in the above-identified patent and that said Letters Patent is hereby corrected as shown below:

On the title page,
Item [56], right column, under " 8702162" insert
--OTHER PUBLICATIONS

Burkhart et al. "A Monolithically Integrated 128 LED-Driver and its Application"; IEEE Transactions on Consumer Electronics, Vol. CE-32, No. 1, February 1986, Pages 26-30.--;

First page, 3rd-from-bottom line of ABSTRACT, "said" should read --the--;

Column 10, line 20, "$E_{rj}=k_r=*I_r*T_j$," should read --$E_{rj} = K_r * I_r * T_j$,--;

Column 10, line 63, "$T_M$" should read --$T_m$--;

Column 13, line 48, "Also scanned Also scanned" should read --Also scanned--;

Column 15, line 25, "a the" should read --a--;

UNITED STATES PATENT AND TRADEMARK OFFICE
CERTIFICATE OF CORRECTION

PATENT NO. : 5,640,190

DATED : June 17, 1997

INVENTOR(S) : Bollansee et al.

It is certified that error appears in the above-identified patent and that said Letters Patent is hereby corrected as shown below:

Column 15, line 52, "is in comprises" should read --comprises--;

Column 16, line 19, "said" should read --said at least one--;

Column 16, line 47, "their" should read --said recording sources--;

Column 17, line 14, "the a" should read --a--.

Signed and Sealed this

Twenty-first Day of April, 1998

Attest:

BRUCE LEHMAN

Attesting Officer

Commissioner of Patents and Trademarks